(12) United States Patent
King

(10) Patent No.: US 11,621,644 B2
(45) Date of Patent: *Apr. 4, 2023

(54) METHODS AND APPARATUS FOR ZERO VOLTAGE SWITCHING USING FLYBACK CONVERTERS

(71) Applicant: Texas Instruments Incorporated, Dallas, TX (US)

(72) Inventor: Brian Matthew King, Lewisville, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 72 days.

This patent is subject to a terminal disclaimer.

(21) Appl. No.: 16/744,842

(22) Filed: Jan. 16, 2020

(65) Prior Publication Data

US 2020/0153353 A1    May 14, 2020

Related U.S. Application Data

(63) Continuation of application No. 16/011,296, filed on Jun. 18, 2018, now Pat. No. 10,574,147.

(60) Provisional application No. 62/617,706, filed on Jan. 16, 2018.

(51) Int. Cl.
*H02M 3/335*     (2006.01)
*H02M 1/088*     (2006.01)
*H02M 1/00*      (2006.01)

(52) U.S. Cl.
CPC ....... *H02M 3/33592* (2013.01); *H02M 1/088* (2013.01); *H02M 1/0058* (2021.05)

(58) Field of Classification Search
CPC ......... H02M 3/33592; H02M 3/33569; H02M 3/33576; H02M 2001/0058; H02M 1/0058

See application file for complete search history.

(56) References Cited

U.S. PATENT DOCUMENTS

| 5,594,629 | A  | * | 1/1997  | Steigerwald | H02M 3/155 363/131 |
| 6,549,432 | B1 |   | 4/2003  | Giannopoulos et al. | |
| 9,246,394 | B2 |   | 1/2016  | Deng | |
| 9,755,529 | B2 |   | 9/2017  | Chen et al. | |
| 9,837,915 | B2 |   | 12/2017 | Furtner et al. | |
| 9,899,931 | B1 |   | 2/2018  | Chang et al. | |
| 10,320,300 | B2 | * | 6/2019 | Fang | H02M 1/08 |
| 10,574,147 | B2 | * | 2/2020 | King | H02M 3/33592 |

(Continued)

FOREIGN PATENT DOCUMENTS

EP    2621069 A2    7/2013

OTHER PUBLICATIONS

Search Report for PCT Application No. PCT/US19/13434, dated Apr. 18, 2019, 1 page.

*Primary Examiner* — Harry R Behm
(74) *Attorney, Agent, or Firm* — Ray A. King; Frank D. Cimino

(57) ABSTRACT

Methods, apparatus, systems, and articles of manufacture for zero voltage switching of flyback converters are disclosed. An example apparatus includes a first driver to operate a first switch to direct a first current to flow to a first winding of a transformer, and a second driver to operate a second switch to direct a second current to flow to a second winding of the transformer and operate the second switch to cause the second current to discharge a voltage of the first switch.

14 Claims, 8 Drawing Sheets

(56) References Cited

U.S. PATENT DOCUMENTS

| | | | |
|---|---|---|---|
| 2005/0185425 A1* | 8/2005 | Liang | H02M 3/33569 363/16 |
| 2005/0185542 A1 | 8/2005 | Liang et al. | |
| 2007/0121350 A1 | 5/2007 | Duvnjak | |
| 2007/0230222 A1 | 10/2007 | Drabing et al. | |
| 2010/0182806 A1* | 7/2010 | Garrity | H02M 3/33569 363/21.14 |
| 2013/0148385 A1 | 6/2013 | Zhang | |
| 2014/0092646 A1 | 4/2014 | Cleveland et al. | |
| 2014/0198539 A1 | 7/2014 | Lv et al. | |
| 2016/0233779 A1* | 8/2016 | Cohen | H02M 3/33592 |
| 2017/0005585 A1 | 1/2017 | Shimura et al. | |
| 2017/0033698 A1* | 2/2017 | Vemuri | H02M 3/33592 |
| 2017/0054375 A1 | 2/2017 | Phadke et al. | |
| 2017/0063213 A1 | 3/2017 | Lin et al. | |
| 2018/0159437 A1 | 6/2018 | Song et al. | |
| 2018/0226895 A1* | 8/2018 | Song | H02M 1/34 |
| 2018/0301974 A1 | 10/2018 | Lin et al. | |
| 2019/0013739 A1* | 1/2019 | Hari | H02M 1/34 |

\* cited by examiner

METHODS AND APPARATUS FOR ZERO VOLTAGE SWITCHING USING FLYBACK CONVERTERS

RELATED APPLICATION

Under 35 U.S.C. §§ 119(e), 120, this continuation application claims benefits of priority to U.S. patent application Ser. No. 16/011,296, filed on Jun. 18, 2018, now U.S. Pat. No. 10,574,147, issued Feb. 25, 2020, which claims benefits of priority to U.S. Provisional Patent Application Ser. No. 62/617,706, which was filed on Jan. 16, 2018. The above referenced applications are hereby incorporated herein by reference in their entirety.

FIELD OF THE DISCLOSURE

This disclosure relates generally to power converters and, more particularly, to methods and apparatus for zero voltage switching using flyback converters.

BACKGROUND

A power converter is a circuit that is used in various devices to convert an input voltage to a desired output voltage. For example, a flyback converter includes an inductor split to form a transformer. The transformer includes a primary winding and a secondary winding across which voltage ratios are scaled. The transformer also provides galvanic isolation between the input and corresponding outputs. The flyback converter controls transistors and/or switches to charge and/or discharge inductors and/or capacitors to maintain a desired output voltage. Some power converters may operate in a transition mode or a quasi-resonant mode in which the transistors and/or the switches do not have a fixed switching frequency, but operate at a first valley point of circuit resonance based on a flyback reflected voltage.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Figure 1:
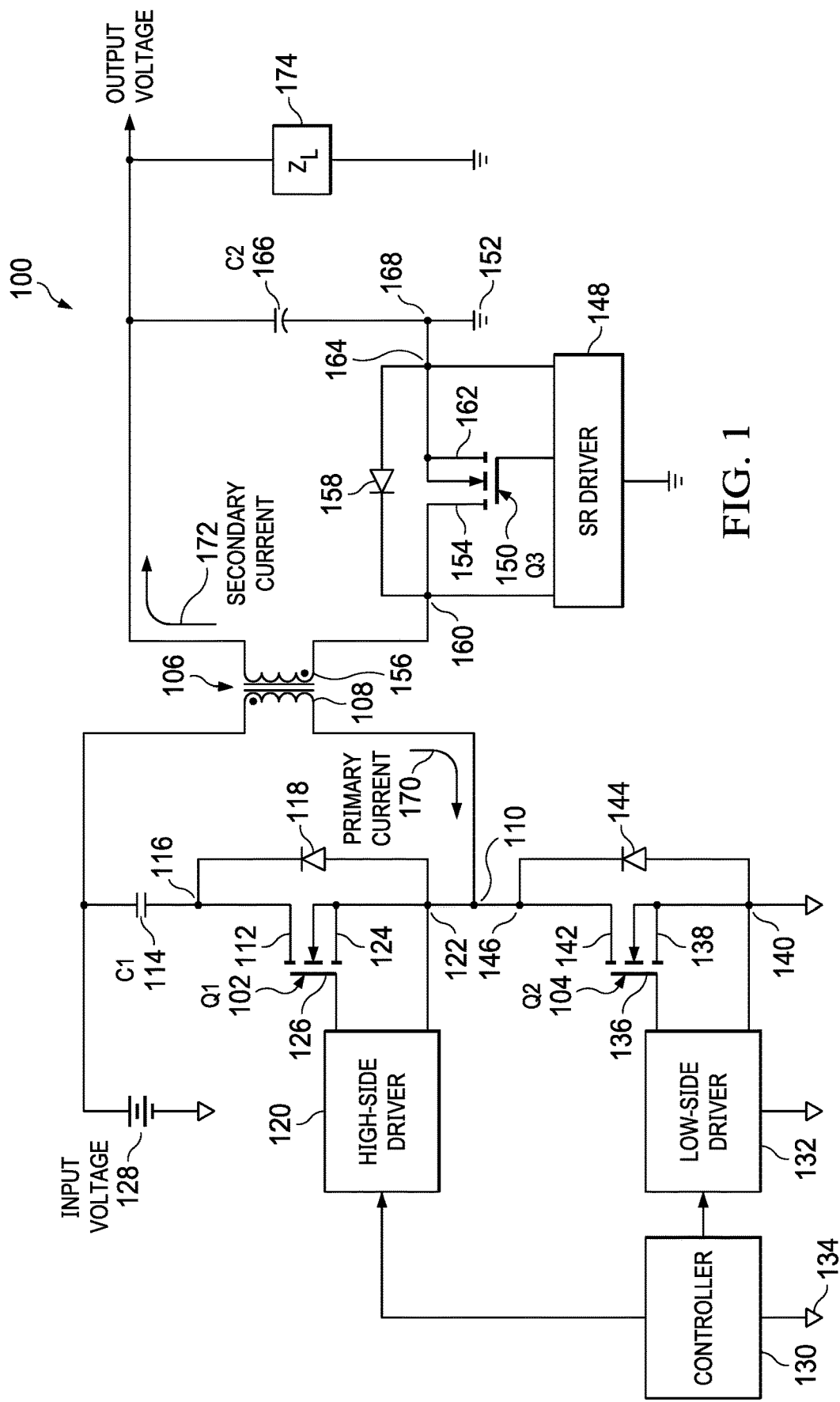
FIG. 1 is a schematic illustration of a typical power conversion system including a high-side primary switch and a low-side primary switch to operate a typical active clamp flyback transformer.

Flyback converters are typically used in both alternating current (AC) to direct current (DC) and DC to DC power conversion applications with galvanic isolation between an input and one or more corresponding outputs. A flyback converter includes an inductor split to form a transformer (e.g., a flyback transformer) so that the voltage at the primary winding is commutable and/or is otherwise transferrable to a voltage on the secondary winding. Transformers also provide an additional advantage of isolation. In some instances, the flyback converter is a passive clamp flyback converter when energy from a leakage inductance is dissipated using a passive clamp including, for example, a Zener diode in series with a blocking diode on a primary side of the transformer core. In other instances, the flyback converter is an active clamp flyback (ACFB) converter when energy from the leakage inductance is recycled using an active clamp including, for example, a high-voltage field-effect transistor (FET) in series with a clamping capacitor on the primary side of the transformer core.

Flyback converters can operate in one of several modes including a discontinuous mode, a continuous mode, or a transition mode. A special case of transition mode is typically referred to as a quasi-resonant (QR) mode. In the discontinuous mode, the flyback converter discharges all energy stored in the transformer core in between cycles (e.g., no energy stored in the transformer core) and/or operations of the flyback converter. In some instances, the flyback converter operates based on a fixed switching frequency. For example, the flyback converter can turn on a control FET and then turn off the control FET when a specific quantity of drain current is reached. The flyback converter can turn back on the control FET at a fixed time subsequent the control FET being turned off. In the continuous mode, the flyback converter begins a new cycle while some energy remains stored in the transformer core.

In the transition mode, the flyback converter operates at the boundary between discontinuous mode and continuous mode, and as a result, does not operate one or more FETs based on a fixed switching frequency. For example, after a FET is enabled, the magnetizing current of the transformer ramps up until a desired current level is reached, at which time the flyback converter turns off the FET. The magnetizing energy is delivered to the output through a secondary winding on the transformer. After the magnetizing current reaches zero, the magnetizing inductance in the flyback transformer rings with the node capacitance causing a drain-to-source voltage of the FET to reduce to a lower voltage level in an oscillatory manner, where the voltage level is based on an input voltage level and a reflected output voltage from the transformer core. In the QR mode, the flyback converter turns back on the FET when one of the troughs or valleys in the drain-to-source voltage occurs.

A typical ACFB converter operates in the transition mode by controlling a high-side primary switch (e.g., a high-voltage FET) and a low-side primary switch (e.g., a high-voltage FET) to control an amount and/or a direction of current (e.g., positive (conventional) current, negative (conventional) current, etc.) flowing through a primary winding of a flyback transformer. However, during a demagnetization time of the ACFB, or a time period during which current in the primary winding is commuted to a secondary winding and subsequently transferred to an output, there is significant current flowing in the primary winding. The current flow on the primary winding distorts a waveform of the current flowing in the secondary winding during the demagnetization time. The distorted waveform complicates implementing synchronous rectifier (SR) control on the secondary winding of the transformer if an SR driver with drain-to-source voltage sensing is used. For example, the distorted waveform can cause a drain-to-source voltage sensing driver to turn off prematurely and, thus, degrade an efficiency of the ACFB converter. The current flow in the primary winding during the demagnetization time can increase conduction loss in both the primary transformer winding and the high-side primary switch.

The ACFB converter can operate in the transition mode to achieve zero voltage switching (ZVS) of the low-side primary switch by using the high-side primary switch to build up a relatively small amount of negative magnetizing current in the primary winding of the flyback transformer. However, the high-side primary switch adds cost and complexity to the ACFB converter. For example, the high-side primary switch is a floating high-side primary switch that requires a corresponding high-side driver to operate, which adds extra cost, complexity, and use of printed circuit board space compared to a conventional flyback implementation.

High-power density ACFB converters operating in the transition mode use wide bandgap (WBG) FETs such as gallium nitride (GaN) and aluminum nitride (AlN) FETs due to their relatively low drain-to-source capacitance. Lower drain-to-source capacitances require less negative current build up on the primary winding to achieve ZVS compared to relatively narrow bandgap FETs such as silicon FETs, which have much higher drain-to-source capacitance. However, WBG FETs are higher in cost, lower in reliability, and are not as widely available compared to silicon FETs.

Examples disclosed herein include improved flyback converters that achieve ZVS on low-side primary switches when operating in the transition mode. Examples disclosed herein include ACFB converters without a high-side primary switch and corresponding high-side driver. Examples disclosed herein control a low-side primary switch coupled to a primary winding of a transformer and a secondary switch coupled to a secondary winding of the transformer using a controller. The controller controls the secondary switch by redirecting a drive signal typically used to control a high-side primary switch to the secondary switch through an isolated driver. In some disclosed examples, the secondary switch that is used to transfer negative current to the primary winding can be on a separate or auxiliary winding of the flyback transformer.

Examples disclosed herein reduce a cost and a complexity of typical ACFB converters by removing components such as the high-side primary switch and the corresponding high-side driver. Examples disclosed herein significantly reduce and/or otherwise minimize a quantity of current flowing in the primary winding during the demagnetization time and, thus, decrease conduction loss in the primary transformer winding.

Examples disclosed herein reduce and/or otherwise eliminate distortion of the waveform associated with current in the secondary winding to improve SR control on the secondary winding. Examples disclosed herein enable ACFB converters to include silicon FETs by reducing the number of primary side FETs thereby causing a decrease in the parasitic capacitance due to the output capacitance of the primary side FETs, which allows less negative current build up in the transformer to achieve ZVS.

FIG. 1 is a schematic illustration of a typical power conversion system 100 including a first switch (Q1) 102 and a second switch (Q2) 104 to operate a transformer 106. The power conversion system 100 of FIG. 1 is an active clamp flyback (ACFB) converter. In FIG. 1, the first switch 102 is a high-side primary switch and the second switch 104 is a low-side primary switch. The first switch 102 and the second switch 104 are coupled to a first winding 108 of the transformer 106 at a first node 110. In FIG. 1, the first winding 108 is a primary winding of the transformer 106.

In the illustrated example of FIG. 1, the first switch 102 and the second switch 104 are N-channel metal oxide semiconductor field-effect transistors (MOSFETs) (e.g., power N-channel MOSFETs). In FIG. 1, a first drain 112 of the first switch 102 is coupled to a first capacitor (C1) 114 at a second node 116. In FIG. 1, a first body diode 118 is represented as being coupled to the first capacitor 114 at the second node 116. The first body diode 118 is represented as being coupled to a first driver 120, the primary winding 108, and the second switch 104 at a third node 122. In FIG. 1, the first driver 120 is a high-side driver. In FIG. 1, a first source 124 of the first switch 102 is coupled to the first body diode 118, the high-side driver 120, the primary winding 108, and the second switch 104 at the third node 122.

In the illustrated example of FIG. 1, a first gate 126 and the first source 124 of the first switch 102 are coupled to the first driver 120. The first driver 120 controls a switching operation (e.g., turn on, turn off, etc.) of the first switch 102 that controls a flow of current from a power source 128 with a corresponding input voltage. The power source 128 of FIG. 1 can be a battery, a voltage source (e.g., a wall outlet providing an AC voltage, etc.), etc. In FIG. 1, a controller 130 controls and/or otherwise directs or instructs the first driver 120 to operate the first switch 102.

The controller 130 of FIG. 1 controls and/or otherwise directs or instructs a second driver 132 to operate the second switch 104. In FIG. 1, the second driver 132 is a low-side driver. The second driver 132 controls a switching operation of the second switch 104 that is disposed between the transformer 106 and a negative supply rail 134. In FIG. 1, a second gate 136 and a second source 138 of the second switch 104 are coupled to the second driver 132. The second source 138 is coupled to the second driver 132 at a fourth node 140. In FIG. 1, a second drain 142 is coupled and a second body diode 144 is represented as being coupled to the first switch 102 and the primary winding 108 at a fifth node 146.

In the illustrated example of FIG. 1, a third driver 148 controls and/or otherwise facilitates an operation of a secondary side of the transformer 106. The third driver 148 of FIG. 1 is a synchronous rectifier (SR) driver. The third driver 148 controls a switching operation of a third switch (Q3) 150 that is disposed between the transformer 106 and a ground supply 152. The third switch 150 of FIG. 1 is an N-channel MOSFET (e.g., an N-channel power MOSFET).

The third switch 150 of FIG. 1 includes a third drain 154 coupled to a second winding 156 of the transformer 106. The second winding 156 of the transformer 106 is a secondary winding. In FIG. 1, a third body diode 158 of the third switch 150 is represented as being coupled to the secondary winding 156 at a sixth node 160. The third switch 150 of FIG. 1 includes a third source 162 coupled to the third driver 148 and is represented as being coupled to the third body diode 158 at a seventh node 164. The seventh node 164 of FIG. 1 is coupled to the ground supply 152 and a second capacitor (C2) 166 at an eighth node 168.

In operation, the controller 130 and the third driver 148 control switching operations of the first switch 102, the second switch 104, and the third switch 150 to operate in the transition mode. The controller 130 and the third driver 148 can operate the power conversion system 100 to achieve ZVS of the second switch 104 by using the first switch 102 to build up a relatively small amount of negative magnetizing current in the primary winding 108 of the transformer 106. At least one of the controller 130 or the third driver 148 can control the negative current built up in the primary winding 108 to achieve ZVS during turn on of the second switch 104.

In the illustrated example of FIG. 1, the controller 130 directs the second driver 132 to turn on the second switch 104. In response to the second switch 104 being enabled or in the ON state, a first current 170 flows from the power source 128 to the primary winding 108 to store energy in the primary winding 108 of the transformer 106. The first current 170 of FIG. 1 is a primary current that corresponds to a current flowing to and/or from the primary winding 108 of the transformer 106. When the primary current 170 causes energy stored in the primary winding 108 to satisfy a threshold (e.g., a quantity of energy that exceeds an expected or specified quantity of energy), the controller 130 turns off the second switch 104 via the second driver 132. In response to turning off the second switch 104, the primary current 170 of the primary winding 108 causes a drain-to-source voltage of the second switch 104 to rise until the first body diode 118 conducts and effectively clamps the drain-to-source voltage to the input voltage of the power source 128.

In response to the rising voltage on the secondary winding 156, the primary current 170 commutes to the secondary winding 156 to generate and/or otherwise cause a second current 172, or a secondary current 172, to flow from the secondary winding 156 to at least one of the second capacitor 166 or a load 174. For example, the primary current 170 generates flux in the transformer 106 to generate the secondary current 172 and/or otherwise induce the secondary current 172 to flow from the secondary winding 156. In FIG. 1, the load 174 can be any device that requires power. For example, the load 174 can be a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device and/or any device that requires power to function.

After a relatively short delay from turning off the second switch 104, the controller 130 turns on the first switch 102 via the first driver 120 and substantially simultaneously (e.g., at relatively the same time in accordance with physical limitations of components or devices depicted in FIG. 1) with the third driver 148 turning on the third switch 150, where the first switch 102 and the third switch 150 are turned on with ZVS. Alternatively, the controller 130 may turn on the first switch 102 at not necessarily the same time as the third driver 148 turns on the third switch 150. When a substantial portion or all of the energy stored in the transformer 106 has been delivered to the load 174 and/or any other corresponding outputs, the third driver 148 turns off the third switch 150. In response to turning off the third switch 150 while maintaining the first switch 102 in the ON state, a relatively small amount of negative current builds up on the primary winding 108. When the amount of negative current satisfies a threshold, the controller 130 turns off the first switch 102 causing the built-up negative current in the primary winding 108 to discharge the parasitic capacitances of the first switch 102 and the second switch 104 and/or, more generally, the power conversion system 100 of FIG. 1. In response to discharging the parasitic capacitances, the controller 130 re-triggers the power conversion system 100 by turning on the second switch 104 via the second driver 132.

The power conversion system 100 of FIG. 1 is a relatively complex and costly implementation for an ACFB converter due to the inclusion of the first switch 102 and the corresponding first driver 120. The first switch 102 and the first driver 120 cause a substantial amount of current flow in the primary winding 108 during the demagnetization time and, thus, increase conduction loss in the primary winding 108. The power conversion system 100 of FIG. 1 uses WBG FETs for the first switch 102 and the second switch 104, which are costlier FETs and less reliable FETs compared to silicon FETs. In some examples, the third switch 150 is a WBG FET.

Figure 2:
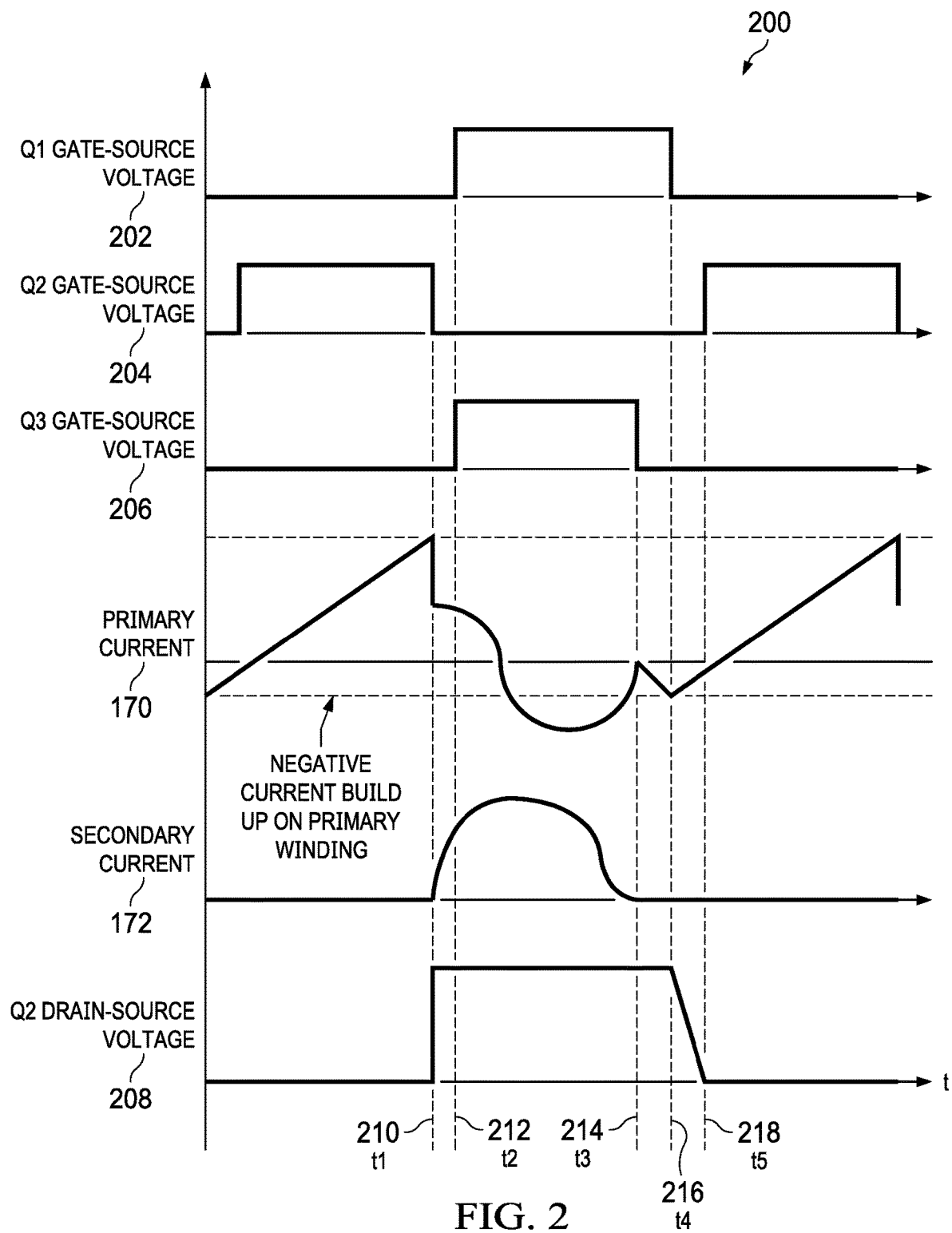
FIG. 2 depicts a typical timing diagram corresponding to operation of the power conversion system of FIG. 1.

FIG. 2 depicts a typical timing diagram 200 corresponding to operation of the power conversion system 100 of FIG. 1. The timing diagram 200 of FIG. 2 depicts a first gate-source voltage (Q1 Gate-Source Voltage) 202 associated with the first switch 102 of FIG. 1, a second gate-source voltage (Q2 Gate-Source Voltage) 204 associated with the second switch 104 of FIG. 1, a third gate-source voltage (Q3 Gate-Source Voltage) 206 associated with the third switch 150 of FIG. 1, and a drain-source voltage (Q2 Drain-Source Voltage) 208 associated with the second switch 104 as a function of time (t). Further shown are the primary current 170 and the secondary current 172 of FIG. 1 as a function of time.

In the timing diagram 200 of FIG. 2, prior to a first time (t1) 210, the second switch 104 is turned on based on the second gate-source voltage 204 being pulled high and the primary current 170 building and/or otherwise increasing an amount of stored energy in the primary winding 108 of FIG. 1. The time duration during which the primary current 170 is building in the primary winding 108 is typically referred to as the magnetization time.

At the first time 210, the second switch 104 is turned off based on the second gate-source voltage 204 being pulled low. In response to turning off the second switch 104, the primary current 170 commutes to the secondary winding 156 of FIG. 1 causing the secondary current 172 to increase and/or otherwise charge the second capacitor 166 and/or flow through the load 174 of FIG. 1. At the first time 210, the primary current 170 in the primary winding 108 begins to attenuate to zero as the primary leakage inductance of the primary winding 108 is de-energized. At the first time 210, the drain-source voltage 208 of the second switch 104 rises until the first body diode 118 of the first switch 102 conducts and clamps the drain-source voltage 208 to the input voltage of the power source 128 of FIG. 1 through the first capacitor 114.

In the illustrated example of FIG. 2, after a relatively short delay after the first time 210, the first switch 102 turns on at a second time (t2) 212 with ZVS. At the second time 212, the third switch 150 of FIG. 1 turns on with ZVS substantially simultaneously with the first switch 102. The time duration beginning with the second time 212 up until a third time (t3) 214 after the second time 212 is typically referred to as the demagnetization time. During the demagnetization time, the energy stored in the transformer 106 of FIG. 1 is delivered to the load 174 via the secondary winding 156 of FIG. 1.

During the demagnetization time, the transformer primary leakage inductance resonates with the first capacitor 114 of FIG. 1.

In the timing diagram 200 of FIG. 2, there is relatively significant current flowing in the primary winding 108 during the demagnetization time. During the demagnetization time, the primary current 170 flowing through the primary winding 108 distorts the waveform of the secondary current 172 flowing through the secondary winding 156 as depicted by the waveform shown in FIG. 2 for the secondary current 172. For example, an expected waveform for the secondary current 172 of FIG. 2 can be a triangular-shaped waveform (e.g., a sawtooth-shaped waveform) as compared to the distorted waveform depicted in FIG. 2.

In the illustrated example of FIG. 2, at the third time 214, all of the magnetizing energy in the transformer 106 has been delivered to the load 174 and/or any other corresponding outputs. In response to the magnetizing energy being delivered, the third switch 150 is turned off via the third gate-source voltage 206 being pulled low. After the third time 214, current ceases to flow on the secondary winding 156. However, the first switch 102 is still enabled at the third time 214 until a fourth time 216. In response to the first switch 102 being enabled from the third time 214 until the fourth time 216 while at least one of the second switch 104 or the third switch 150 are turned off, a relatively small amount of negative current builds up on the primary winding 108. The controller 130 of FIG. 1 controls the amplitude of the negative current. At the fourth time 216, the controller 130 turns off the first switch 102.

In the timing diagram 200 of FIG. 2, in response to turning off the first switch 102, the negative current in the primary winding 108 discharges the parasitic capacitances of at least one of the first switch 102, the second switch 104, or, more generally, the power conversion system 100 of FIG. 1 as the drain-source voltage 208 of the second switch 104 discharges and/or otherwise attenuates toward zero volts. In response to the drain-source voltage 208 approaching and/or otherwise reaching zero volts at a fifth time (t5) 218, the second switch 104 turns on with ZVS via the second gate-source voltage 204 being pulled high.

Figure 3:
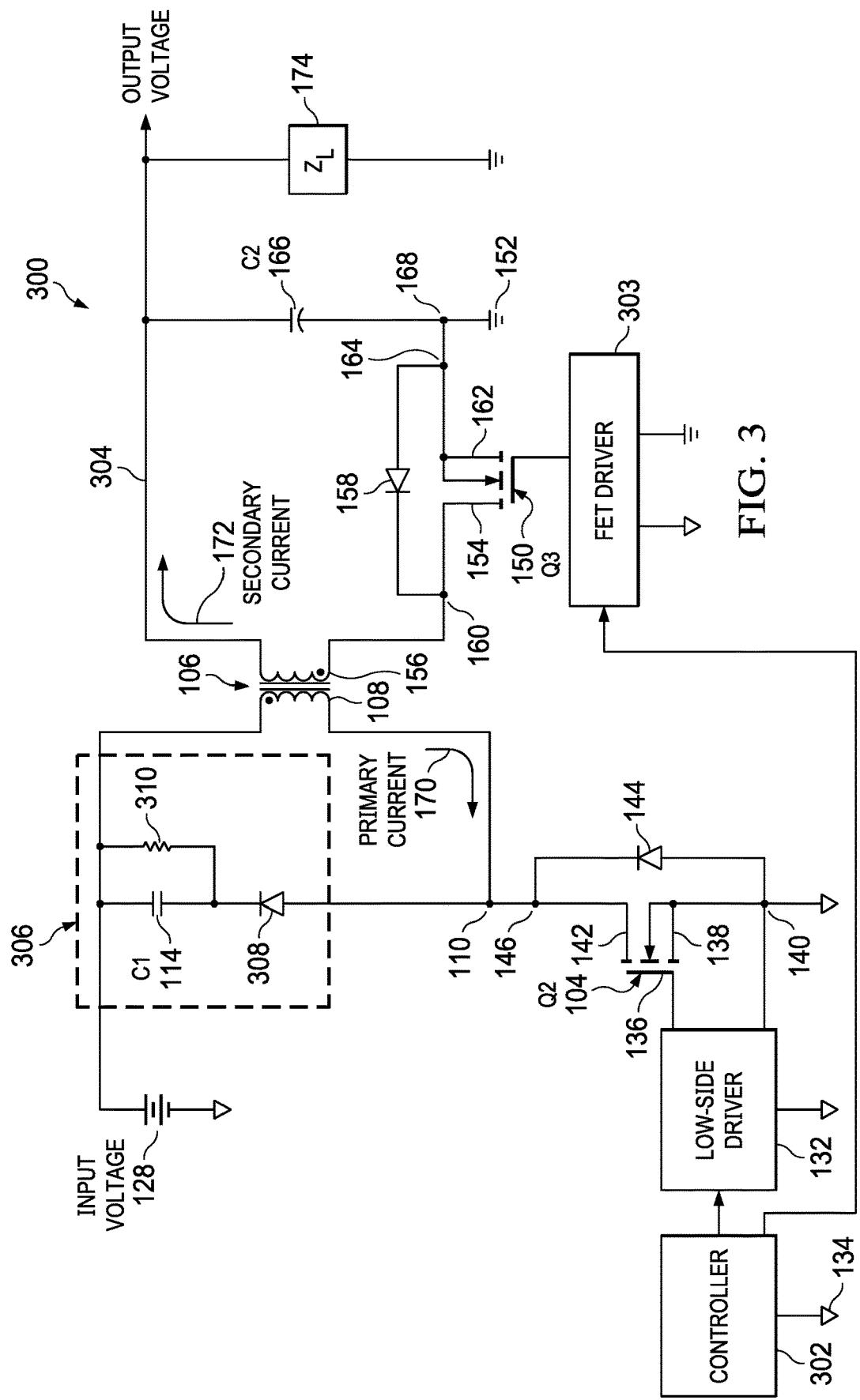
FIG. 3 is a schematic illustration of an example power conversion system to implement the examples disclosed herein.

FIG. 3 is a schematic illustration of an example power conversion system 300 including an example controller 302 to operate a fourth example driver 303 on an example secondary side 304 of the transformer 106 and, more generally, the power conversion system 300 of FIG. 3. In FIG. 3, the fourth driver 303 is a FET driver (e.g., a power FET driver). Alternatively, the fourth driver 303 may be any other type of driver. In some examples, the controller 302 operates the FET driver 303 to build up negative current on the secondary winding 156 to operate the second switch 104 of FIG. 1 with ZVS during the transition mode.

In FIG. 3, the fourth driver 303 is an isolated driver that receives and/or otherwise obtains a drive signal from the controller 302 on a first side of the isolation boundary (e.g., an input to the fourth driver 303) and drives the synchronous rectifier on a second side of the isolation boundary (e.g., an output of the fourth driver 303). In some examples, the fourth driver 303 is an IC with a built-in or integrated driver and corresponding isolation. In other examples, the fourth driver 303 is a gate driver transformer. Alternatively, the fourth driver 303 may be implemented using a discrete implementation. The fourth driver 303 of FIG. 3 performs at least two functions, where a first function drives the third switch 150 (e.g., the SR FET) based on the drive signal received from the controller 302, and where a second function provides isolation. The fourth driver 303 of FIG. 3 is different from the third driver 148 of FIG. 1 because the third driver 148 does not receive a drive signal from the controller 130 of FIG. 1 and must provide diode emulation (e.g., not allow reverse current to flow).

In the illustrated example of FIG. 3, the power conversion system 300 is an flyback converter without the first switch 102 and the first driver 120 of FIG. 1. For example, the power conversion system 300 of FIG. 3 is a flyback converter using a passive clamp. The power conversion system 300 of FIG. 3 is a flyback converter without a primary high-side switch such as the first switch 102 of FIG. 1 and without a corresponding high-side driver such as the first driver 120 of FIG. 1. In contrast to a typical ACFB as depicted by the power conversion system 100 of FIG. 1, the power conversion system 300 of FIG. 3 controls and/or otherwise uses the third switch 150 to build up negative current on the secondary winding 156 compared to the power conversion system 100 of FIG. 1 that uses the first switch 102 to build up the negative current on the primary winding 108. In contrast to the power conversion system 100 of FIG. 1, the third switch 150 of FIG. 3 is coupled to the FET driver 303 compared to the third driver 148 of FIG. 1 coupled to the SR driver 148.

In the illustrated example of FIG. 3, the controller 302 is an integrated circuit (IC) chip including one or more electrical circuits. Alternatively, the controller 302 may be implemented using hardware logic, machine readable instructions, hardware implemented state machines, etc., and/or any combination thereof. In FIG. 3, the controller 302 of FIG. 3 turns on the second switch 104 via the second driver 132 to cause the primary current 170 to flow from the power source 128 to the primary winding 108. In response to the primary current 170 storing a quantity of energy in the primary winding 108 that satisfies and/or otherwise exceeds an energy threshold, the controller 302 turns off the second switch 104. In response to turning off the second switch 104, the current in the primary winding 108 commutes and/or otherwise transfers to the secondary winding 156. For example, the primary current 170 generates flux in the transformer 106 to generate the secondary current 172 and/or otherwise induce the secondary current 172 to flow from the secondary winding 156.

In the illustrated example of FIG. 3, by removing the first switch 102 of FIG. 1, there is either no current flow or a negligible quantity of current flow in the primary winding 108 for a majority or a substantially significant portion of the demagnetization time during an operation of the power conversion system 300 of FIG. 3. In response to the no current flow or the negligible amount of current flow in the primary winding 108, the waveform of the secondary current 172 maintains a triangular shape (e.g., a sawtooth-shaped waveform) to prevent and/or otherwise mitigate the possibility of the FET driver 303 from turning off prematurely and, thus, degrading an efficiency of the power conversion system 300 of FIG. 3. For example, the waveform of the secondary current 172 improves an accuracy of predicting and/or otherwise determining losses in the secondary circuit.

In the illustrated example of FIG. 3, the coupling between the primary winding 108 and the secondary winding 156 is imperfect because there is leakage inductance between them. During commutation from the primary winding 108 to the secondary winding 156, the leakage energy corresponding to the leakage inductance cannot be directly transferred to the secondary winding 156 and consequently must be absorbed. When the second switch 104 is turned off, the leakage energy of the primary winding 108 is absorbed by an example clamping network 306. The clamping network 306 of FIG. 3 includes the first capacitor 114 of FIG. 1, an example diode 308, and an example resistor 310. Alternatively, the resistor 310 may be replaced with a transient voltage suppressor diode, a Zener diode, etc. The clamping network 306 absorbs and/or otherwise dissipates the leakage energy from the transformer 106 to reduce voltage stress on the second switch 104.

Figure 4:
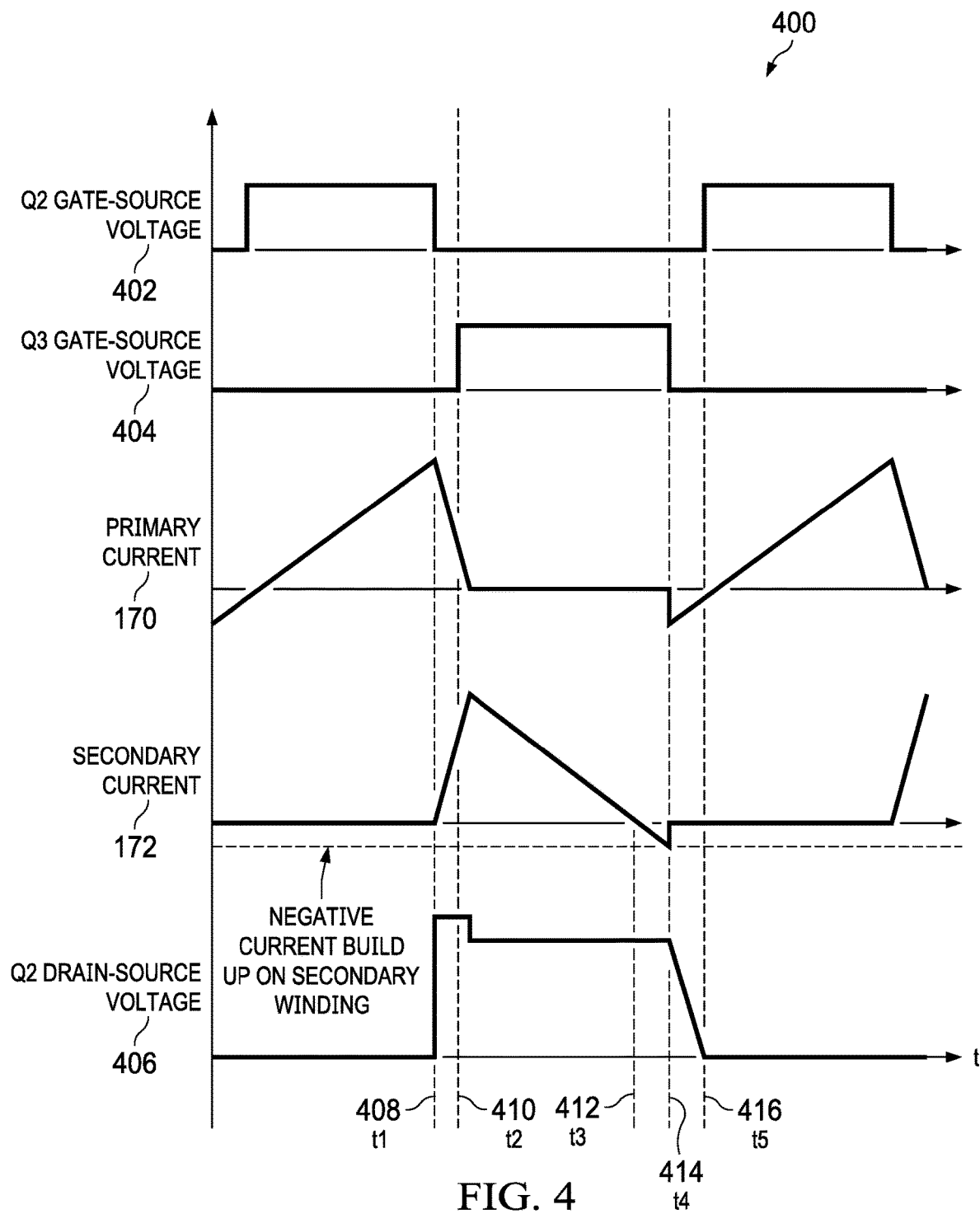
FIG. 4 depicts an example timing diagram corresponding to operation of the example power conversion system of FIG. 3.

FIG. 4 depicts an example timing diagram 400 corresponding to operation of the power conversion system 300 of FIG. 3. The timing diagram 400 of FIG. 4 depicts a second example gate-source voltage (Q2 Gate-Source Voltage) 402 associated with the second switch 104 of FIG. 3, a third example gate-source voltage (Q3 Gate-Source Voltage) 404 associated with the third switch 150 of FIG. 3, and an example drain-source voltage (Q2 Drain-Source Voltage) 406 associated with the second switch 104 as a function of time (t). Further shown are the primary current 170 and the secondary current 172 of FIG. 3 as a function of time.

In the timing diagram 400 of FIG. 4, prior to a first example time (t1) 408, the second switch 104 is turned on based on the second gate-source voltage 402 being pulled high. Prior to the first time 408, the primary current 170 builds and/or otherwise increases an amount of stored energy in the primary winding 108 of FIG. 3. At the first time 408, the second switch 104 is turned off based on the second gate-source voltage 402 being pulled low. In response to turning off the second switch 104, the primary current 170 commutes to the secondary winding 156 of FIG. 3 generating and/or otherwise causing the secondary current 172 to increase and/or otherwise charge the second capacitor 166 and/or flow through the load 174 of FIG. 3. At the first time 408, the primary current 170 in the primary winding 108 begins to attenuate to zero (e.g., approximately linearly attenuate to zero) as the primary leakage inductance is de-energized by the clamping network 306 of FIG. 3. At the first time 408, the drain-source voltage 406 of the second switch 104 rises until the diode 308 of FIG. 3 conducts and clamps the drain-source voltage 406 to the clamping network 306 and input voltage of the power source 128 of FIG. 3.

In the illustrated example of FIG. 4, after a relatively short delay after the first time 408, the third switch 150 turns on at a second example time (t2) 410 with ZVS. Relatively shortly after the second time 410, the secondary current 172 ramps down and/or otherwise attenuates toward zero at a substantially linear rate. During the demagnetization time from the second time 410 until a third example time (t3) 412, the energy stored in the transformer 106 of FIG. 1 is delivered to the load 174 via the secondary winding 156 of FIG. 3.

In the timing diagram 400 of FIG. 4, for a substantially significant portion (e.g., a majority) of the demagnetization time, there is either no current or a negligible amount of current flowing in the primary winding 108. In response to the either no current or the negligible amount of current in the primary winding 108, the waveform of the secondary current 172 depicted in FIG. 4 maintains an expected and/or otherwise predictable triangular shape (e.g., a sawtooth-shaped waveform).

In the illustrated example of FIG. 4, at the third time 412, all of the magnetizing energy in the transformer 106 has been delivered to the load 174 and/or any other corresponding outputs. In response to the magnetizing energy being delivered, the controller 302 of FIG. 3 instructs the FET driver 303 to maintain the third switch 150 in the ON position to direct and/or otherwise cause a relatively small amount of negative current to build up on the secondary winding 156. For example, at the third time 412, the controller 302 can instruct the FET driver 303 to maintain the third switch 150 in the ON position after the magnetizing current in the secondary winding 156 attenuates to approximately zero amps. By maintaining the third switch 150 in the ON position, the controller 302 via the FET driver 303 can direct a quantity of energy corresponding to the relatively small amount of negative current in the secondary winding 156 to be stored in the transformer 106.

In the example of FIG. 4, the controller 302 via the FET driver 303 keeps the third switch 150 in the ON position from the third time 412 until a fourth example time (t4) 414. At the fourth time 414, the controller 302 instructs the FET driver 303 to turn off the third switch 150. In response to turning off the third switch 150, the negative current in the secondary winding 156 commutes to the primary winding 108 to discharge the parasitic capacitance of the second switch 104 and/or, more generally, the power conversion system 300 of FIG. 3, as the drain-source voltage 406 of the second switch 104 discharges and/or otherwise approaches zero volts.

At an example fifth time (t5) 416, the controller 302 turns on the second switch 104 via the second driver 132 with ZVS as the drain-source voltage 406 is approximately zero volts due to the negative current generated on the secondary winding 156 via the third switch 150. In contrast to the power conversion system 100 of FIG. 1, where the controller 302 builds negative current on the primary winding 108 to discharge the parasitic capacitances in the power conversion system 100, the controller 302 included in the power conversion system 300 of FIG. 3 discharges the parasitic capacitances in the power conversion system 300 by building negative current in the secondary winding 156 via the FET driver 303 operating the third switch 150 as described above.

Figure 5:
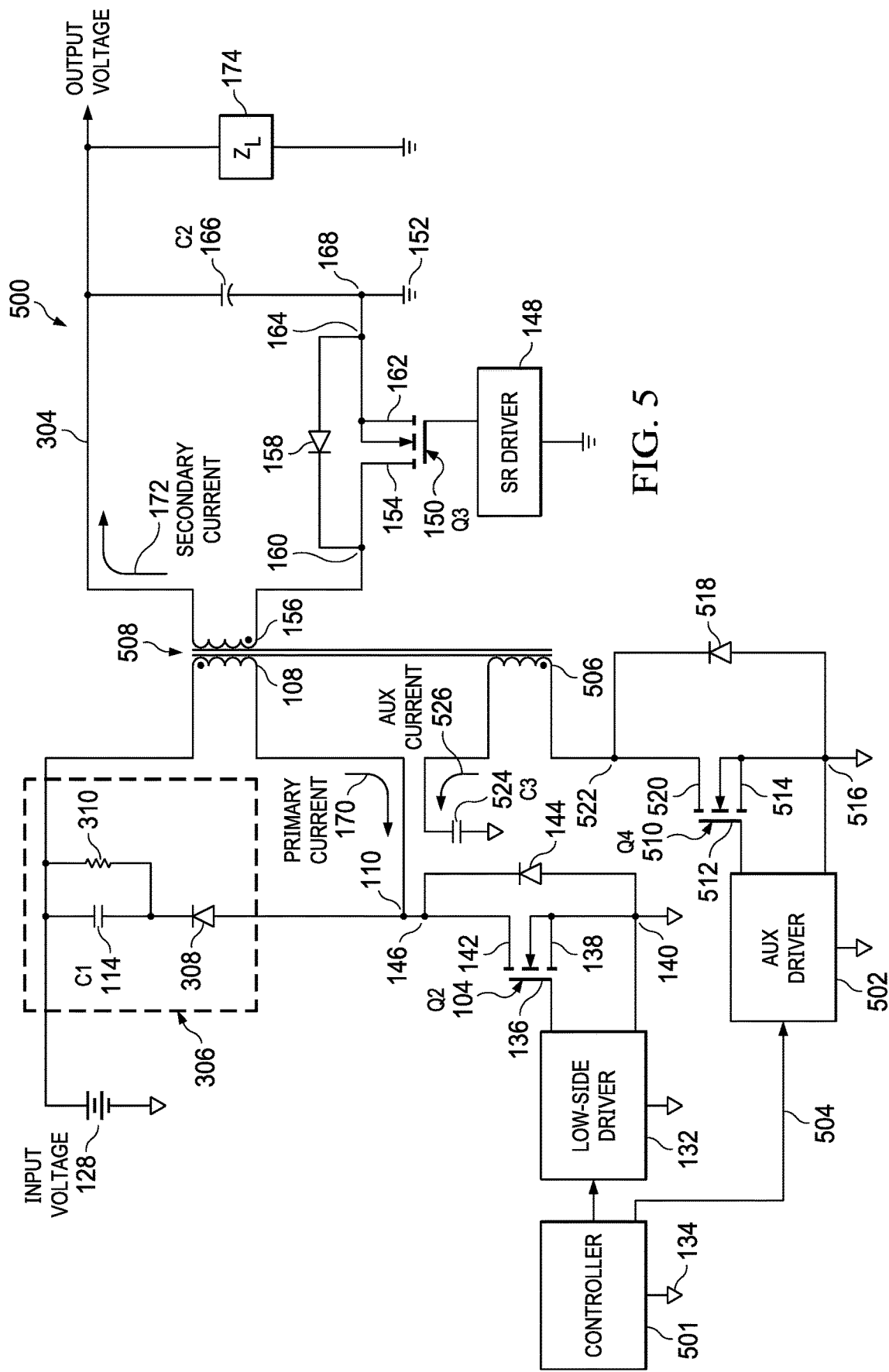
FIG. 5 is a schematic illustration of another example power conversion system to implement the examples disclosed herein.

FIG. 5 is a schematic illustration of another example power conversion system 500 including another example controller 501 to operate a fifth example driver 502 on an example auxiliary side 504 or portion of the power conversion system 500. In some examples, the controller 501 of FIG. 5 is the same or substantially similar to the controller 302 of FIG. 3. In FIG. 5, the controller 501 is an integrated circuit (IC) chip including one or more electrical circuits. Alternatively, the controller 501 may be implemented using hardware logic, machine readable instructions, hardware implemented state machines, etc., and/or any combination thereof.

In FIG. 5, the fifth driver 502 is an auxiliary (AUX) driver or an AUX FET driver (e.g., an AUX power FET driver). Alternatively, the fifth driver 502 may be any other type of driver. For example, the fifth driver 502 can be integrated into the controller 501 (e.g., integrated into an IC including the controller 501). In other examples, the fifth driver 502 can be a stand-alone driver IC or a discrete implementation. The controller 501 operates the AUX driver 502 to build up negative current on an example auxiliary winding 506 of an example transformer 508 to operate the second switch 104 of FIG. 1 with ZVS during the transition mode.

In FIG. 5, the transformer 508 includes the primary winding 108 and the secondary winding 156 of FIG. 1 and the auxiliary winding 506. Alternatively, the transformer 508 may have fewer or more than the windings shown in FIG. 5. In FIG. 5, the AUX driver 502 is coupled to the controller 501 of FIG. 5 and a fourth example switch (Q4) 510. The fourth switch 510 of FIG. 5 is an N-channel MOSFET.

Alternatively, the power conversion system 500 may be implemented using a P-channel MOSFET for the fourth switch 510.

In FIG. 5, the AUX driver 502 is coupled to the fourth switch 510 at a fourth example gate 512. In FIG. 5, the AUX driver 502 is coupled to the fourth switch 510 at a fourth example source 514 at a ninth example node 516. The AUX driver 502 of FIG. 5 is represented as being coupled to a fourth example body diode 518 at the ninth node 516. The fourth body diode 518 of FIG. 5 is represented as being coupled to a fourth example drain 520 of the fourth switch 510 and the auxiliary winding 506 at a tenth example node 522. In FIG. 5, the auxiliary winding 506 is coupled to the fourth drain 520 and is represented as being coupled to the fourth body diode 518 at the tenth node 522. The auxiliary winding 506 of FIG. 5 is coupled to a third example capacitor (C3) 524. The third capacitor 524 holds the bias rail corresponding to the power source 128 for the controller 501 and associated circuitry.

In the illustrated example of FIG. 5, the controller 501 turns on the second switch 104 via the second driver 132 to direct the primary current 170 of FIG. 1 to build up in the primary winding 108 of FIG. 1. In response to the primary current 170 storing a quantity of energy that satisfies and/or otherwise is greater than a threshold to be stored in the primary winding 108 and/or, more generally, the transformer 508 of FIG. 5, the controller 501 turns off the second switch 104 via the second driver 132. In response to turning off the second switch 104, the current in the primary winding 108 commutes to at least one of the secondary winding 156 or the auxiliary winding 506. In response to turning off the second switch 104, the SR driver 148 of FIG. 1 turns on the third switch 150 to cause and/or otherwise direct the secondary current 172 to at least one of charge the second capacitor 166 or flow through the load 174 of FIG. 1 and/or any other corresponding outputs. In response to turning off the second switch 104, the controller 501 commands the AUX driver 502 to turn on the fourth switch 510 to cause an example auxiliary current 526 to flow to the third capacitor 524 to replenish charge in the capacitor used to power the controller 501 of FIG. 5 and associated circuitry.

In operation, when the magnetizing energy in the transformer 106 has been delivered to the load 174 and/or any other corresponding outputs, the SR driver 148 turns off the third switch 150 while the controller 501 maintains the fourth switch 510 in the ON position via the AUX driver 502. By keeping the fourth switch 510 enabled after the third switch 150 is turned off, the controller 501 causes a relatively small amount of negative current to build up in the auxiliary winding 506. For example, the fourth switch 510 enables current (e.g., negative current, negative conventional current, etc.) to flow from the third capacitor 524 to the auxiliary winding 506. In response to a quantity of energy corresponding to the negative current satisfying an energy threshold, the controller 501 instructs the AUX driver 502 to turn off the fourth switch 510.

In response to turning off the fourth switch 510, the negative current on the auxiliary winding 506 is commuted to the primary winding 108, which, in turn, discharges the parasitic capacitance of the second switch 104. For example, the negative current generates flux in the transformer 508 to generate negative current and/or otherwise induce negative current to flow from the primary winding 108 to discharge the parasitic capacitance of the second switch 104. In response to discharging the parasitic capacitance of the second switch 104 as the drain-source voltage of the second switch 104 attenuates to approximately zero volts. By discharging the parasitic capacitance, the controller 501 can turn on the second switch 104 with ZVS via the second driver 132.

Figure 6:
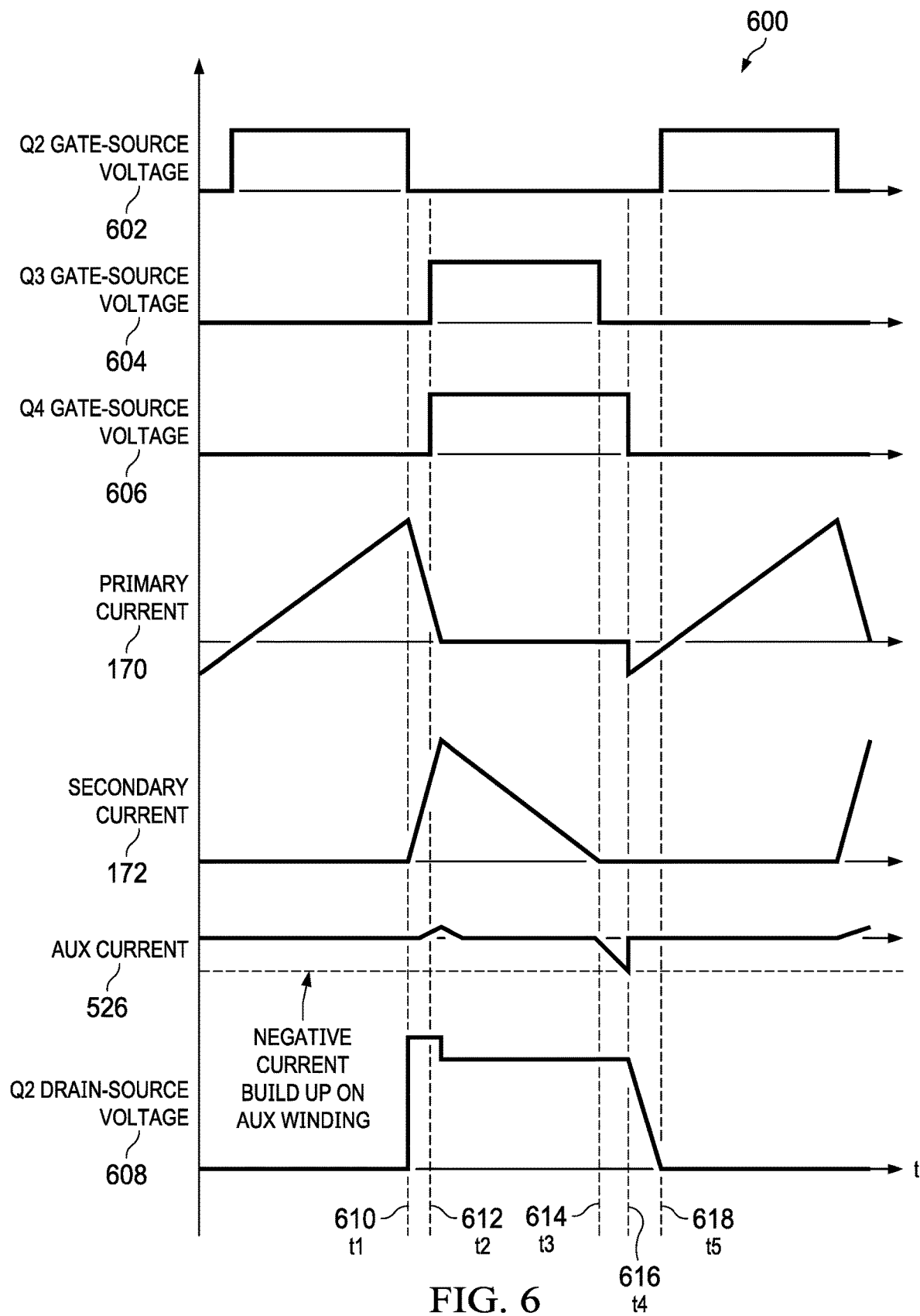
FIG. 6 depicts an example timing diagram corresponding to operation of the example power conversion system of FIG. 5.

FIG. 6 depicts an example timing diagram 600 corresponding to operation of the power conversion system 500 of FIG. 5. The timing diagram 600 of FIG. 6 depicts a second example gate-source voltage (Q2 Gate-Source Voltage) 602 associated with the second switch 104 of FIG. 5, a third example gate-source voltage (Q3 Gate-Source Voltage) 604 associated with the third switch 150 of FIG. 5, a third example gate-source voltage (Q3 Gate-Source Voltage) 606 associated with the fourth switch 510 of FIG. 5, and an example drain-source voltage (Q2 Drain-Source Voltage) 608 associated with the second switch 104 of FIG. 5 as a function of time (t). Further shown are the primary current 170, the secondary current 172, and the auxiliary current 526 of FIG. 5 as a function of time.

In the timing diagram 600 of FIG. 6, prior to a first example time (t1) 610, the second switch 104 is turned on based on the second gate-source voltage 602 being pulled high. Prior to the first time 610, the primary current 170 builds and/or otherwise increases an amount of stored energy in the primary winding 108 of FIG. 5. At the first time 610, the second switch 104 is turned off based on the second gate-source voltage 602 being pulled low. In response to turning off the second switch 104, the primary current 170 commutes to the secondary winding 156 of FIG. 5 generating and/or otherwise causing the secondary current 172 to increase and/or otherwise charge the second capacitor 166 and/or flow through the load 174 of FIG. 3 and/or flow to or through any other corresponding outputs. At the first time 610, the primary current 170 in the primary winding 108 begins to attenuate to zero (e.g., approximately linearly attenuate to zero) as the primary leakage inductance is de-energized by the clamping network 306 of FIG. 5. At the first time 610, the drain-source voltage 606 of the second switch 104 rises until the diode 308 of FIG. 5 conducts and clamps the drain-source voltage 606 to the clamping network 306 and input voltage of the power source 128 of FIG. 5.

In the illustrated example of FIG. 6, after a relatively short delay after the first time 610, the SR driver 148 turns on the third switch 150 at a second example time (t2) 612 with ZVS. Relatively shortly after the second time 612, the secondary current 172 ramps down and/or otherwise attenuates toward zero at a substantially linear rate. During the demagnetization time from the second time 612 until a third example time (t3) 614, the energy stored in the transformer 508 of FIG. 5 is delivered to the load 174 via the secondary winding 156 of FIG. 5.

In the timing diagram 600 of FIG. 6, for a substantially significant portion (e.g., a majority) of the demagnetization time, there is either no current or a negligible amount of current flowing in the primary winding 108. In response to the either no current or the negligible amount of current in the primary winding 108, the waveform of the secondary current 172 depicted in FIG. 6 maintains an expected and/or otherwise predictable triangular shape (e.g., a sawtooth-shaped waveform). The triangular shape waveform of the secondary current 172 prevents the SR driver 148 of FIG. 5 from prematurely turning off the third switch 150 as can occur with the power conversion system 100 of FIG. 1 due to the distorted waveform of the secondary current 172 depicted in FIG. 2.

In the illustrated example of FIG. 6, at the third time 614, all of the magnetizing energy in the transformer 508 has been delivered to the load 174 and/or any other corresponding outputs. In response to the magnetizing energy being delivered, the controller 501 of FIG. 5 instructs the AUX driver 502 to maintain the fourth switch 510 in the ON position to direct and/or otherwise cause a relatively small amount of negative current to build up on the auxiliary winding 506 of FIG. 5. For example, at the third time 614, the controller 501 can instruct the AUX driver 502 to maintain the fourth switch 510 in the ON position after the magnetizing current in the secondary winding 156 attenuates to approximately zero amps. By maintaining the fourth switch 510 in the ON position, the controller 501 via the AUX driver 502 can direct a quantity of energy corresponding to the relatively small amount of negative current in the auxiliary winding 506 to be stored in the transformer 508.

In the example of FIG. 6, the controller 501 via the AUX driver 502 keeps the fourth switch 510 in the ON position from the third time 614 until a fourth example time (t4) 616. At the fourth time 616, the controller 501 instructs the AUX driver 502 to turn off the fourth switch 510. In response to turning off the fourth switch 510, the negative current in the auxiliary winding 506 commutes to the primary winding 108 to discharge the parasitic capacitance of the second switch 104 and/or, more generally, the power conversion system 500 of FIG. 5 as the drain-source voltage 608 of the second switch 104 discharges and/or otherwise approaches zero volts.

At an example fifth time (t5) 618, the controller 501 turns on the second switch 104 via the second driver 132 with ZVS as the drain-source voltage 606 is approximately zero volts due to the negative current generated on the auxiliary winding 506 via the fourth switch 510. In contrast to the power conversion system 100 of FIG. 1, where the controller 130 builds negative current on the primary winding 108 to discharge the parasitic capacitances in the power conversion system 100, the controller 501 included in the power conversion system 300 of FIG. 5 discharges the parasitic capacitances in the power conversion system 500 based on building negative current in the auxiliary winding 506 via the AUX driver 502 operating the fourth switch 510 as described above.

Figure 7:
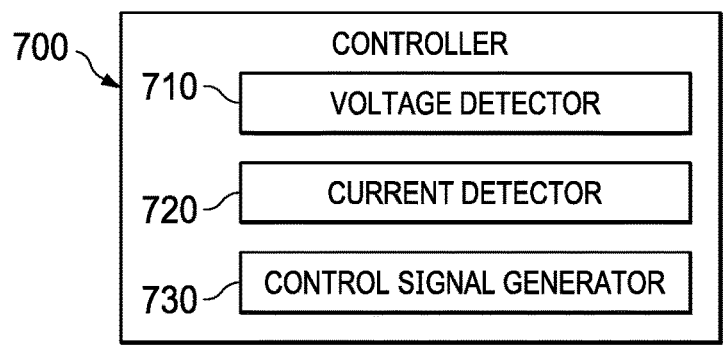
FIG. 7 is a block diagram of an example implementation of an example controller included in the example power conversion system of FIGS. 3 and/or 5.

FIG. 7 is a block diagram of an example implementation of an example controller 700 that can implement the controller 302 of FIG. 3 and/or the controller 501 of FIG. 5. In some examples, the controller 700 controls a low-side primary switch with ZVS based on building up negative current on a secondary winding, an auxiliary winding, etc., compared to building up negative current on a primary winding as implemented by typical ACFB converter implementations (e.g., the power conversion system 100 of FIG. 1). In the illustrated example of FIG. 7, the controller 700 includes an example voltage detector 710, an example current detector 720, and an example control signal generator 730.

In the illustrated example of FIG. 7, the controller 700 includes the voltage detector 710 to measure and/or otherwise sample at a periodic interval (e.g., a synchronous interval) or an aperiodic interval (e.g., an asynchronous interval) a voltage. In some examples, the voltage detector 710 measures a drain-source voltage of a switch. For example, the voltage detector 710 can measure a drain-source voltage of at least one of the second switch 104 or the third switch 150 of FIG. 3. In such examples, the voltage detector 710 can measure the drain-source voltage via a voltage sensor (e.g., a VDS sensor) coupled to the second switch 104, the third switch 150, etc. In other examples, the voltage detector 710 can measure a drain-source voltage of at least one of the second switch 104, the third switch 150, or the fourth switch 510 of FIG. 5. In such examples, the voltage detector 710 can measure the drain-source voltage via a voltage sensor (e.g., a VDS sensor) coupled to the second switch 104, the third switch 150, or the fourth switch 510. For example, the voltage detector 710 can correspond to a voltage sensor coupled to the first node 110 to measure the drain-source voltage of the second switch 104. In other examples, the voltage detector 710 can correspond to a voltage sensor coupled to the tenth node 522 to measure the drain-source voltage of the fourth switch 510.

In some examples, the voltage detector 710 measures a voltage associated with a winding of a transformer. For example, the voltage detector 710 can measure a voltage of an input and/or an output of at least one of the primary winding 108 or the secondary winding 156 of FIG. 3. In such examples, the voltage detector 710 can measure the voltage via a voltage sensor coupled to the input and/or the output of the one or more windings. For example, the voltage detector 710 can correspond to a resistor divider from the auxiliary winding 506 of the transformer 508. In other examples, the voltage detector 710 can measure a voltage of an input and/or an output of at least one of the primary winding 108, the secondary winding 156, or the auxiliary winding 506 of FIG. 5. In such examples, the voltage detector 710 can measure the voltage via a voltage sensor coupled to the input and/or the output of the one or more windings.

In the illustrated example of FIG. 7, the controller 700 includes the current detector 720 to measure and/or otherwise sample at a periodic interval (e.g., a synchronous interval) or an aperiodic interval (e.g., an asynchronous interval) a current. In some examples, the current detector 720 measures a current flowing through and/or otherwise is associated with a winding of a transformer. For example, the current detector 720 can measure a current flowing through at least one of the primary winding 108 or the secondary winding 156 of FIG. 3. In such examples, the current detector 720 can measure the current via a current sensor coupled to the input and/or the output of the one or more windings. For example, the current detector 720 can correspond to a current sense resistor or a current sense transformer. In other examples, the current detector 720 can measure a current flowing through at least one of the primary winding 108, the secondary winding 156, or the auxiliary winding 506 of FIG. 5. In such examples, the current detector 720 can measure the current via a current sensor coupled to the input and/or the output of the one or more windings.

In the illustrated example of FIG. 7, the controller 700 includes the control signal generator 730 to generate a control signal such as a voltage signal, a current signal, etc. For example, the control signal generator 730 can generate a voltage signal, a current signal, etc., to instruct at least one of the second driver 132 or the FET driver 303 of FIG. 3 to turn on or turn off the second switch 104 and/or the third switch 150 of FIG. 3. In other examples, the control signal generator 730 can generate a voltage signal, a current signal, etc., to direct at least one of the second driver 132, the SR driver 148, or the AUX driver 502 of FIG. 5 to turn on or turn off at least one of the second switch 104, the third switch 150, or the fourth switch 510 of FIG. 5.

In some examples, the control signal generator 730 generates a control signal based on a measured parameter satisfying a threshold. For example, the control signal generator 730 can operate a switch when a measured voltage satisfies a voltage threshold. For example, the control signal generator 730 can turn on the second switch 104 of FIG. 3 when a voltage sensor measures a drain-source voltage of the second switch 104 that satisfies a voltage threshold.

In some examples, the control signal generator 730 generates a control signal when a measured current satisfies a current threshold. For example, the control signal generator 730 can turn off the second switch 104 of FIG. 3 when a current sensor measures a current flowing through the primary winding 108 that satisfies a current threshold. For example, the control signal generator 730 can turn off the second switch 104 when the primary current 170 is 1 ampere and, thus, is greater than a current threshold of 0.5 amperes. In other examples, the control signal generator 730 can turn on or off a switch when a current flowing through a corresponding winding is less than a current threshold.

While an example manner of implementing the controller 700 of FIGS. 3 and/or 5 is illustrated in FIG. 7, one or more of the elements, processes, and/or devices illustrated in FIG. 7 may be combined, divided, re-arranged, omitted, eliminated, and/or implemented in any other way. Further, the example voltage detector 710, the example current detector 720, the example control signal generator 730, and/or, more generally, the example controller 700 of FIG. 7 may be implemented by hardware, software, firmware, and/or any combination of hardware, software, and/or firmware. Thus, for example, any of the example voltage detector 710, the example current detector 720, the example control signal generator 730, and/or, more generally, the example controller 700 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the example voltage detector 710, the example current detector 720, and/or example the control signal generator 730 is/are hereby expressly defined to include a non-transitory computer readable storage device or storage disk such as a memory, a digital versatile disk (DVD), a compact disk (CD), a Blu-ray disk, etc., including the software and/or firmware. Further still, the example controller 700 of FIG. 7 may include one or more elements, processes, and/or devices in addition to, or instead of, those illustrated in FIG. 7, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 8:
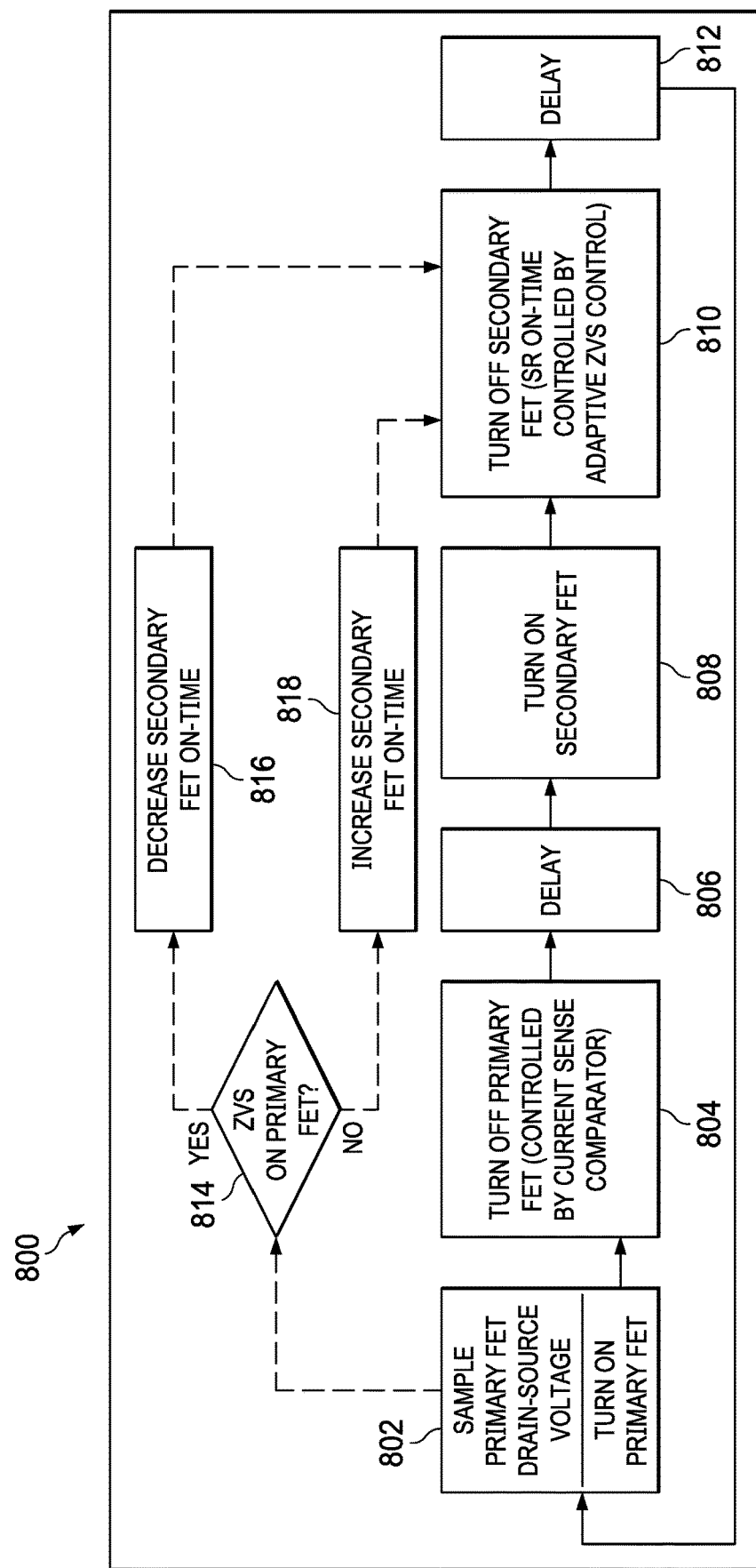
FIG. 8 is a flowchart representative of example machine readable instructions that may be executed to implement the example controller of FIG. 7.

A flowchart representative of example hardware logic, machine readable instructions, hardware implemented state machines, and/or any combination thereof for implementing the controller 700 of FIG. 7 is shown in FIG. 8. The machine readable instructions may be an executable program or portion of an executable program for execution by a computer processor such as the processor 912 shown in the example processor platform 900 discussed below in connection with FIG. 9. The program may be embodied in software stored on a non-transitory computer readable storage medium such as a CD-ROM, a floppy disk, a hard drive, a DVD, a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowchart illustrated in FIG. 8, many other methods of implementing the example controller 700 of FIG. 7 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example process of FIG. 8 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory, and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

FIG. 8 is a flowchart representative of example machine readable instructions 800 which may be executed to implement the example controller 700 of FIG. 7 to operate at least the second switch 104 of FIGS. 3 and/or 5 with ZVS. For example, the machine readable instructions 800 can implement the controller 302 of FIG. 3 and/or the controller 501 of FIG. 5.

At block 802, the controller 700 samples a primary drain-source voltage at substantially simultaneously with turning on the primary FET. For example, the voltage detector 710 of FIG. 7 can measure the drain-source voltage of the second switch 104 of FIG. 3 (e.g., measure with a voltage sensor coupled to and/or otherwise monitoring the second switch 104). In such examples, the control signal generator 730 of FIG. 7 can instruct the second driver 132 to turn on the second switch 104.

In response to turning on the primary FET, the controller 700 turns off the primary FET based on a current measured by a current sense comparator at block 804. For example, the current detector 720 of FIG. 7 can measure a current flowing through the primary winding 108 of FIG. 3. In such examples, the current detector 720 can compare the current to a current threshold and the control signal generator 730 can turn off the second switch 104 via the second driver 132 based on the comparison. For example, the control signal generator 730 can turn off the second switch 104 when the primary current 170 flowing through the primary winding 108 is greater than a current threshold (e.g., a pre-defined current threshold).

The controller 700 triggers a delay at block 806 after turning off the primary FET. At block 808, the controller 700 turns on a secondary FET. For example, the control signal generator 730 can turn on the third switch 150 of FIG. 3 via the FET driver 303 of FIG. 3 based on adaptive ZVS control. For example, the control signal generator 730 can turn on the third switch 150 to deliver the secondary current 172 from the secondary winding 156 to at least one of the second capacitor 166, the load 174, or any other corresponding outputs.

In other examples, the control signal generator 730 can turn on the fourth switch 510 of FIG. 5 via the AUX driver 502 of FIG. 5 based on adaptive ZVS control. For example, the control signal generator 730 can turn on the fourth switch 510 to deliver the auxiliary current 526 from the auxiliary winding 506 to the third capacitor 524. In response to turning on the secondary FET, the controller 700 triggers a delay at block 812. After the delay at block 812, the controller 700 returns to block 802 to sample the primary FET drain-source voltage and substantially simultaneously turns on the primary FET.

In the machine readable instructions 800 of FIG. 8, in response to performing the operations of block 802, the controller 700 determines whether ZVS is occurring on the primary FET at block 814. For example, the control signal generator 730 can determine based on the drain-source voltage of the second switch 104 measured by the voltage detector 710 whether the second switch 104 is turned on with ZVS. For example, if the second switch 104 is turned on when the drain-source voltage of the second switch 104 is greater than 0 volts, the control signal generator 730 can determine that the second switch 104 did not turn on with ZVS. In other examples, if the second switch 104 is turned on when the drain-source voltage of the second switch 104 is less than a ZVS threshold (e.g., 0.1 volts, 0.3 volts, etc.), the control signal generator 730 can determine that the second switch 104 turned on with ZVS.

If, at block 814, the controller 700 determines that ZVS occurred on the primary FET, then, at block 816, the control signal generator 730 decreases the secondary FET on-time. For example, the control signal generator 730 can decrease the time duration during which the FET driver 303 of FIG. 3 maintains the third switch 150 of FIG. 3 in the ON state.

If, at block 814, the controller 700 determines that ZVS did not occur on the primary FET, then, at block 818, the control signal generator 730 increases the secondary FET on-time. For example, the control signal generator 730 can increase the time duration during which the FET driver 303 of FIG. 3 maintains the third switch 150 of FIG. 3 in the ON state. In such examples, the control signal generator 730 directs additional negative current to build up on the secondary winding 156 of FIG. 3 by maintaining the third switch 150 in the ON state for a longer duration. By building up additional negative current on the secondary winding 156, the drain-source voltage of the second switch 104 can attenuate to approximately zero volts when the increased quantity of negative current commutes to the primary winding 108 when the third switch 150 is turned off at block 810.

Figure 9:
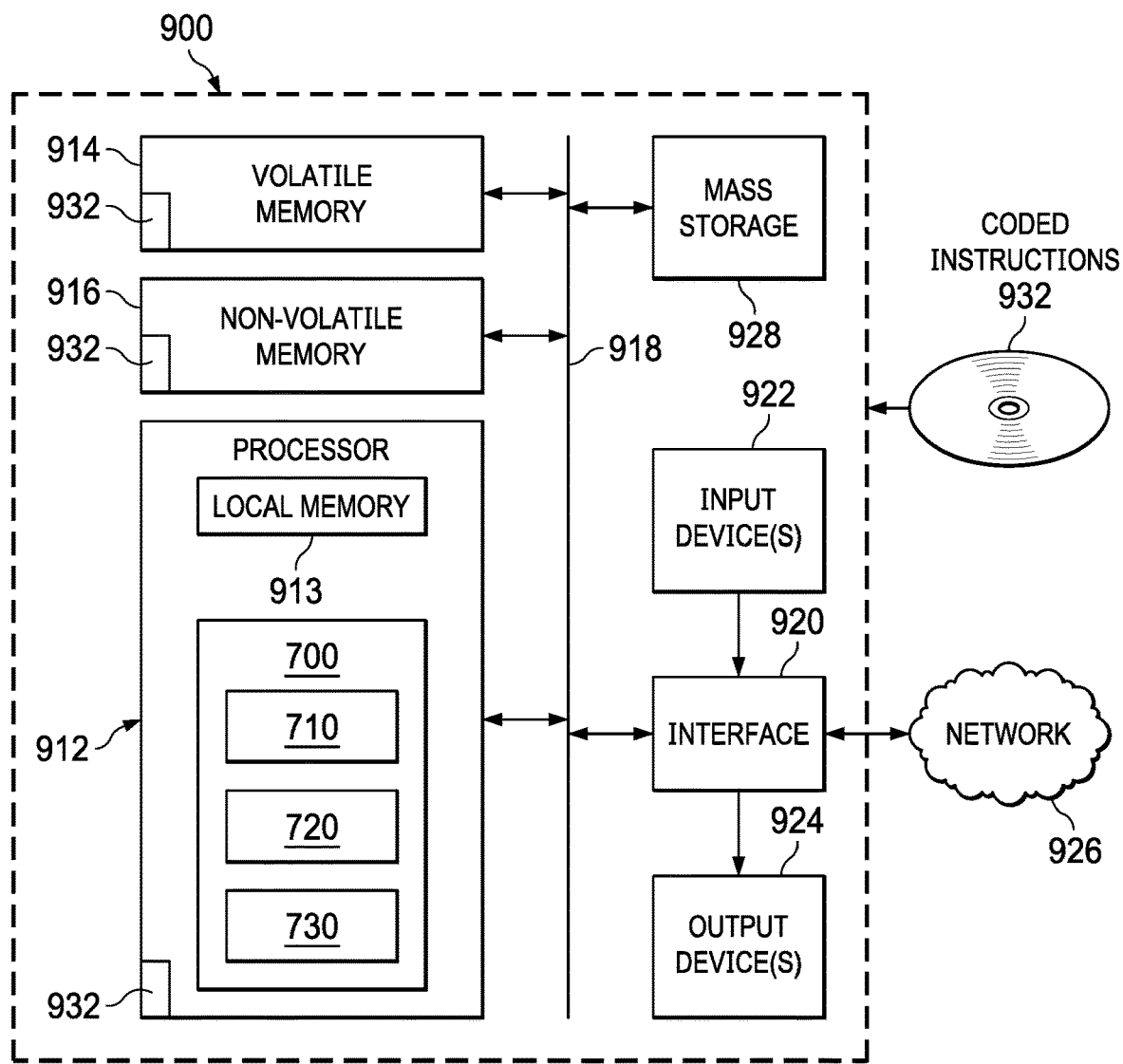
FIG. 9 is a block diagram of an example processing platform structured to execute the instructions of FIG. 8 to implement the example controller of FIG. 7.

FIG. 9 is a block diagram of an example processor platform 900 structured to execute the instructions of FIG. 8 to implement the controller 700 of FIG. 7. For example, the processor platform 900 can be structured to execute the instructions of FIG. 8 to implement the controller 302 of FIG. 3 and/or the controller 501 of FIG. 5. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 912 implements the example controller 700, the example voltage detector 710, the example current detector 720, and the example control signal generator 730 of FIG. 7.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS® Dynamic Random Access Memory (RDRAM®), and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface.

In the illustrated example, one or more input devices 922 are connected to the interface circuit 920. The input device(s) 922 permit(s) a user to enter data and/or commands into the processor 912. The input device(s) 922 can be implemented by, for example, an audio sensor, a microphone, a camera (still or video), a keyboard, a button, a mouse, a touchscreen, a track-pad, a trackball, an isopoint device, and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer, and/or speaker. The interface circuit 920 of the illustrated example, thus, typically includes a graphics driver card, a graphics driver chip, and/or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and digital versatile disk (DVD) drives.

The machine executable instructions 932 of FIG. 8 may be stored in the mass storage device 928, in the volatile memory 914, in the non-volatile memory 916, and/or on a removable non-transitory computer readable storage medium such as a CD or DVD.

From the foregoing, it will be appreciated that example methods, apparatus and articles of manufacture for zero voltage switching of flyback converters are disclosed herein. Examples disclosed herein reduce a cost and complexity of flyback converters such as active clamp flyback converters by eliminating a high-side primary switch and corresponding isolated drive circuitry associated with a primary winding of a flyback transformer. Examples disclosed herein reduce a current flow in the primary winding of the flyback transformer during the demagnetization time and, thus, decrease the conduction loss in the primary transformer winding and the corresponding clamping network compared to a traditional active clamp flyback converter.

Examples disclosed herein improve an efficiency with ZVS using alternative types of FETs to wide bandgap FETs such as silicon FETs. The reduction in switches coupled to and/or otherwise associated with the primary winding of the flyback transformer reduces the corresponding parasitic capacitance causing less negative current build up in the flyback transformer to achieve ZVS. In some disclosed examples, a higher efficiency can be achieved when using silicon FETs compared to wide bandgap FETs in typical active clamp flyback converters. Examples disclosed herein provide simplified and/or otherwise less complex control of synchronous rectification operation in the secondary side of the flyback converter.

Examples disclosed herein simplify control by controlling the synchronous rectification directly by the controller and, thus, eliminate a need for drain-source sensing or other diode emulation techniques typically included in an SR driver of typical flyback converters. Additionally, examples disclosed herein maintain a predictable triangular shape for the waveform of current flowing through the secondary winding of the flyback transformer since either no current or a negligible quantity of current is flowing in the primary winding while current is flowing through the secondary winding.

Although certain example methods, apparatus, and articles of manufacture have been disclosed herein, the scope of coverage of this patent is not limited thereto. On the contrary, this patent covers all methods, apparatus, and articles of manufacture fairly falling within the scope of the claims of this patent.

What is claimed is:

1. An apparatus comprising:
a first transistor having a first gate, a first source and a first drain, the first source directly connected to a first ground terminal, and the first drain coupled to a first terminal of a first transformer winding;
a resistor and a capacitor connected in parallel having respective first and second terminals, the respective first terminals coupled to a second terminal of the first transformer winding and are directly connected to an input voltage terminal;
a diode having a cathode directly connected to the respective second terminals of the resistor and the capacitor, and having an anode directly connected to the first drain;
a second transistor having a second gate, a second source and a second drain, the second drain coupled to a first terminal of a second transformer winding;
a first driver circuit having a first driver input and a first driver output, the first driver output coupled to the first gate;
a second driver circuit having a second driver input and a second driver output, the second driver output coupled to the second gate;
a controller having:
a voltage detector configured to detect a drain-to-source voltage of the first transistor;
a first control output coupled to the first driver input, the controller configured to provide a first control signal at the first control output to direct a first current to flow from the first transformer winding to the first drain during a first time period; and
a second control output coupled to the second driver input, the controller configured to provide a second control signal at the second control output to direct a second current to flow from the second transformer winding to an output terminal during a second time period after the first time period, and to direct a third current to flow from the second transformer winding to the second transistor during the second time period and for a duration adjustable responsive to the drain-to-source voltage of the first transistor, wherein the controller is configured to direct a fourth current to flow from the first drain to the first transformer winding until the drain-to-source voltage of the first transistor is discharged after the second time period.

2. The apparatus of claim 1, wherein the fourth current flows from the first drain to the first transformer winding after the second time period and when the first transistor is turned off.

3. The apparatus of claim 2, wherein the fourth current discharges the voltage across the first switch after the second time period and before the first switch is turned on.

4. The apparatus of claim 1, wherein the first transistor is an N-channel field effect transistor (NFET).

5. The apparatus of claim 1, wherein the controller is configured to increase the duration of the third current when the drain-to-source voltage of the first transistor is above a zero voltage switching threshold during the second time period.

6. The apparatus of claim 1, wherein the controller is configured to decrease the duration of the third current when the drain-to-source voltage of the first transistor is below a zero voltage switching threshold during the second time period.

7. The apparatus of claim 1, further comprising:
a first driver having an input coupled to the first control output, and having an output coupled to the first gate; and
a second driver having an input coupled to the second control output, and having an output coupled to the second gate.

8. An integrated circuit comprising:
a first transistor having a first gate, a first source and a first drain, the first source directly connected to a first ground terminal, and the first drain adapted to be coupled to a first terminal of a first winding of a transformer;
a resistor and a capacitor connected in parallel, the resistor and capacitor having respective first and second terminals, the respective first terminals adapted to be coupled to a second terminal of the first winding of the transformer and are directly connected to an input voltage terminal;
a diode having a cathode directly connected only to the respective second terminals of the resistor and the capacitor, and having an anode directly connected to the first drain;
a second transistor having a second gate, a second source and a second drain, the second drain adapted to be coupled to a first terminal of a second winding of the transformer;
a first driver circuit having a first driver input and a first driver output, the first driver output coupled to the first gate;
a second driver circuit having a second driver input and a second driver output, the second driver output coupled to the second gate;
a controller having:
  a voltage detector configured to detect a drain-to-source voltage of the first transistor;
  a first control output coupled to the first gate, the controller configured to provide a first driver signal; and
  a second control output coupled to the second gate, the controller configured to provide a second driver signal;
wherein the first and second driver signals are configured to:
  direct a first current to flow from the first winding to the first drain during a first time period;
  direct a second current to flow from the second winding to an output terminal during a second time period after the first time period; and
  direct a third current to flow from the second winding to the second transistor during the second time period and for a duration adjustable responsive to the drain-to-source voltage of the first transistor, wherein a fourth current flows from the first drain to the first winding until the drain-to-source voltage of the first transistor is discharged to zero after the second time period.

9. The integrated circuit of claim 8, wherein the first winding includes a primary winding of the transformer, and the second winding includes a secondary winding of the transformer.

10. The integrated circuit of claim 8, wherein the fourth current flows from the first drain to the first winding after the second time period while the first transistor remains turned off.

11. The integrated circuit of claim 8, wherein the first transistor is an N-channel field effect transistor (NFET).

12. The integrated circuit of claim 8, wherein the controller is configured to increase the duration of the third current when the drain-to-source voltage of the first transistor is above a zero voltage switching threshold during the second time period.

13. The integrated circuit of claim 8, wherein the controller is configured to decrease the duration of the third current when the drain-to-source voltage of the first transistor is below a zero voltage switching threshold during the second time period.

14. The integrated circuit of claim 8, further comprising:
a first driver having an input coupled to the first control output, and having an output coupled to the first gate; and
a second driver having an input coupled to the second control output, and having an output coupled to the second gate.

* * * * *